United States Patent [19]

Andrzejewski et al.

[11] 4,107,898
[45] Aug. 22, 1978

[54] CHANNEL-SHAPED SEALING, GUIDING OR FINISHING STRIPS AND THE LIKE

[75] Inventors: Heinz Andrzejewski; Werner Kruschwitz; Robert G. Bright, all of Viersen, Germany

[73] Assignee: Draftex Development AG, Switzerland

[21] Appl. No.: 791,108

[22] Filed: Apr. 26, 1977

[30] Foreign Application Priority Data

Apr. 26, 1976 [GB] United Kingdom ............... 16912/76

[51] Int. Cl.² ............................................. E04C 2/38
[52] U.S. Cl. .................................. 52/716; 52/309.16; 49/490
[58] Field of Search ..................... 52/716, 717, 309.16; 49/441, 491, 490; 428/83, 93, 122

[56] References Cited

U.S. PATENT DOCUMENTS

| | | | |
|---|---|---|---|
| 1,867,312 | 7/1932 | Gaines | 49/441 X |
| 2,457,312 | 12/1948 | Kramer | 49/491 |
| 3,256,577 | 6/1966 | Bright | 49/491 X |
| 3,993,819 | 11/1976 | Fewkes | 52/716 X |

*Primary Examiner*—Ernest R. Purser
*Assistant Examiner*—Carl D. Friedman
*Attorney, Agent, or Firm*—Leydig, Voit, Osann, Mayer & Holt, Ltd.

[57] ABSTRACT

A channel-shaped structure is shown in which a channel-shaped metal carrier has a covering of flexible material which is arranged to define a gripping rib running along and protruding from one inside wall of the channel. Metal reinforcement at least partly extends into the gripping rib. Also disclosed is a metal carrier comprising a series of U-shaped metal elements which are spaced from each other and are each provided with a corrugation which runs around the U from the end of one leg of the U to the end of the other leg thereof.

10 Claims, 7 Drawing Figures

CHANNEL-SHAPED SEALING, GUIDING OR FINISHING STRIPS AND THE LIKE

BACKGROUND OF THE INVENTION

The invention relates to channel-shaped strips for sealing and/or decorative purposes such as, for example, for gripping and covering edge flanges surrounding an opening in a vehicle body.

It is known to construct such sealing strips by covering a relatively flexible channel-shaped metal carrier with elastomeric material. A problem which has to be overcome is a tendency of moisture to travel around the flange by passing inside the channel and over the flange edge - between the latter and the base of the channel. It is known to provide the opposite facing side walls of the channel with gripping ribs running longitudinally along the channel for engaging and sealing against the sides of the flanges, but these do not necessarily completely overcome the problem.

It is therefore an object of the invention to provide an improved channel-shaped sealing strip.

A more specific object of the invention is to provide an improved channel-shaped sealing strip which has a more effective gripping and sealing function.

Another object of the invention is to provide a channel-shaped sealing strip with an improved metal carrier.

BRIEF SUMMARY OF THE INVENTION

According to the invention, there is provided a channel-shaped strip structure comprising channel-shaped metal carrier means having a covering of flexible material thereover which is arranged to define a gripping rib running along and protruding from one inside wall of the channel, and metal reinforcement which at least partly extends into the gripping rib. The presence of such metal reinforcement strengthens the whole structure and provides greatly improved gripping properties for the gripping rib, helping to ensure that the strip is not inadvertently pulled off an edge flange in use.

According to the invention, there is also provided a channel-shaped strip structure comprising metal carrier means embedded in flexible covering material, the metal carrier means comprising a series of U-shaped metal elements which are spaced from each other and are each provided with a corrugation which runs around the U from the end of one leg of the U to the end of the other leg thereof. In this case, there may be no metal reinforcement such as has been referred to above. This structure is advantageous in that the corrugations in the elements give added strength to the metal carrier, allong the thickness of the metal from which it is made to be reduced (with a consequent saving in cost).

DESCRIPTION OF THE DRAWINGS

Channel-shaped strips embodying the invention will now be described, by way of example only, with reference to the accompanying drawings in which:

As shown in FIGS. 1 and 2, the strip structure is channel-shaped. It comprises a metal core or carrier 8, to be described in more detail below, which is covered with plastics or rubber covering material 10 such as by an extrusion process. The covering material 10 is arranged to form a gripping rib 12 which extends along one inside wall of the channel and is inclined towards the base of the channel. On the opposite inside wall, a series of three smaller gripping ribs or serrations 14 are formed.

Figure 1:
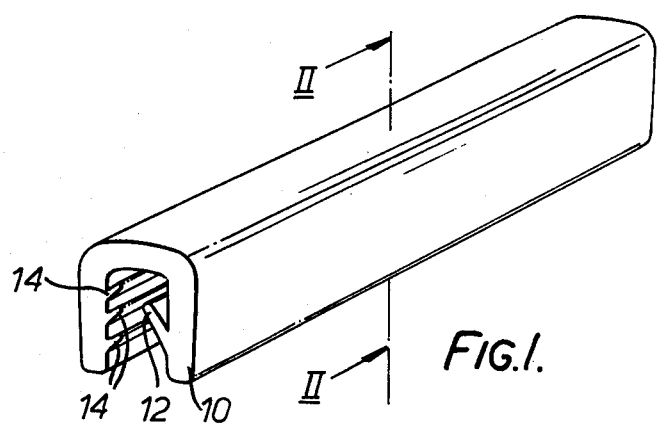
FIG. 1 is a perspective view of one of the strips.

In use, the structure shown in FIG. 1 is placed over a flange such as runs around a door opening in a vehicle body, and the gripping ribs 12, 14 grip and seal against the flange and prevent inadvertent removal of the strip. The strip thus decorates and protects the flange and provides a sealing function. Additionally, if desired, the strip may carry an extra sealing portion attached to and running along its outside surface. Such a sealing portion may advantageously be made of softer material than the material 10, for example sponge rubber, and provides a seal against which a door for the opening closes.

Figure 3:
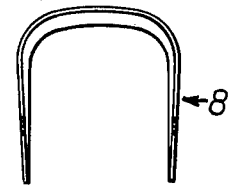
FIG. 3 is an end view of a metal carrier visible in FIG. 2.
Figure 4:
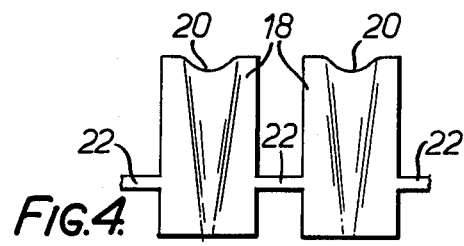
FIG. 4 is a side elevation of a length of the metal carrier of FIG. 3.

FIGS. 3 and 4 show the construction of the metal carrier 8 which is embedded in the material 10. As shown in these Figures, the carrier 8 comprises a series of U-shaped elements 18 arranged side-by-side. Each element is in the form of a U-shaped metal strip but each metal strip has a corrugation 20 which runs along its length, that is, from the end of one leg of the U to the end of the opposite leg of the U, the corrugation being deepest at the centre or base of the U and becoming shallower towards the end of each leg of the U (and in fact virtually disappearing at each leg end). As shown in FIG. 4, the elements 18 may be joined to each other by connecting links 22.

Figure 5:
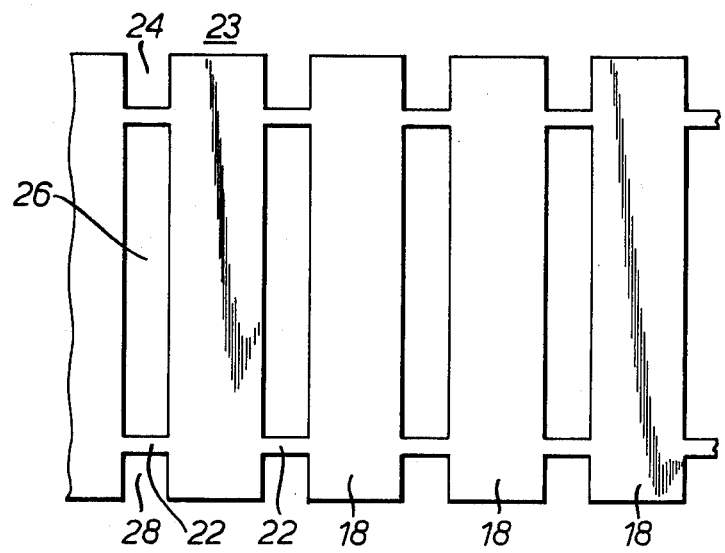
FIG. 5 is a plan view of a metal blank from which the carrier of FIGS. 3 and 4 may be manufactured.

The carrier 8 may, for example, be manufactured by taking a flat elongate rectangular blank 23 (FIG. 5) slotting it as at 24, 26 and 28 to provide the connecting links 22 and the elements 18, providing the corrugations 20 in the elements 18, and then bending the structure into channel-shaped form. However, other methods of construction are possible. For example, the elements may be joined together by wire instead of the connecting links 22.

Figure 6:
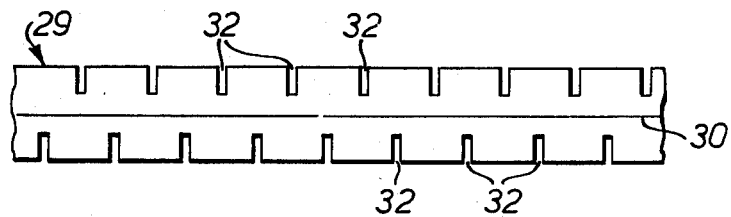
FIG. 6 is a side elevation of a metal reinforcement visible in FIG. 2.

FIG. 6 shows a metal reinforcement 29 which is embedded in the covering material 10 (see FIG. 2) to run along and within the carrier 8. The reinforcement 29 consists of a strip of thin hardened metal which is not flat but bent along a line 30 at an obtuse angle. Its hardness is such as to give the metal spring-like qualities. Advantageously, though not essentially, the reinforcement 29 is provided with slits 32 which extend partway across its width.

Figure 2:
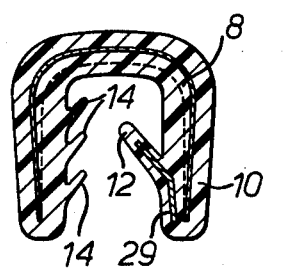
FIG. 2 is a cross-section through the strip on the line II—II of FIG. 1.

FIG. 2 shows how the carrier 8 and the reinforcement 29 are arranged together in the final structure. As shown, the reinforcement 29 runs alongside the carrier 8 close to the end of one leg of each element 18 thereof, and part of the reinforcement 29 extends into the gripping rib 12.

During manufacture of the strip, the carrier 8 and the reinforcement 29 may, for example, be temporarily held in their correct juxtaposition, and the covering material 10 then extruded over them so as to embed them and fix them in the correct relationship. The extrusion process may be carried out with the carrier 8 already in channel form. Instead, however, the extrusion process may be carried out when the carrier 8 is in flat form (with the individual elements 18 and their corrugations 20 already formed therein), the bending operation, to bend the carrier 8 into channel shape, being carried out after the extrusion process.

The structure shown is advantageous in that the corrugations 20 in the elements 18 give added strength to the metal carrier, allowing the thickness of the metal from which it is made to be reduced (with a consequent saving in cost). Furthermore, the presence of the reinforcement 29 strengthens the whole structure and provides greatly improved gripping properties for the gripping rib 12. This is important because it is highly desirable to ensure that a strip structure such as shown in FIG. 1 is not inadvertently pulled off its flange in use.

The construction of the carrier 8 and the reinforcement 29 is such that it does not substantially impede bending of the strip as necessary to accommodate bends and curves in the flange to which it is to be fitted. This bending is facilitated by the separated elements 18 and the slits 32 in the reinforcement 29.

Various modifications are possible.

For example, the carrier 8 and the reinforcement 29 can be positively attached directly to each other. For example, the reinforcement 29 could be spot-welded to each of the elements 18 of the carrier 8. In such an arrangement, the connecting links 22 (FIG. 3) could therefore be dispensed with completely.

Figure 7:
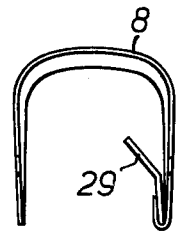
FIG. 7 is an end elevation of a modified form of the metal carrier.

FIG. 7 shows an alternative arrangement in which the carrier 8 and the reinforcement 29 are joined together by extending the length of one leg of each of the U-shaped elements 18 and bending this extended length over and around part of the width of the reinforcement 29. Again, with such a construction the reinforcement 29 holds the elements 18 of the carrier 8 together and could enable the connecting links 22 to be dispensed with.

The strip shown in FIGS. 1 and 2 can be modified by arranging for both inside walls of the channel to carry gripping ribs similar to the gripping rib 12. In such a case, a reinforcement 29 could be arranged on each side of the channel so as each to extend into a respective one of the gripping ribs 12. There may of course be more than one gripping rib 12 on one or both sides of the channel. Each such gripping rib can have a reinforcement 29 partly embedded in it, or alternatively only one or some of the elements need have a reinforcement 29 in it.

Although the structures illustrated have combined the use of the carrier 8 with the reinforcement 29, other arrangements are possible.

For example, the reinforcement 29 can be omitted completely, so that the embedded metal then consists solely of the carrier 8, the elements 18 of which can be interconnected, as by the connecting links 22 for example, or disconnected.

In a further possible construction, the reinforcement 29 can be combined with a channel-shaped carrier different from the carrier 8. For example, such a channel-shaped carrier could consist of a number of uncorrugated U-shaped elements, joined or disconnected from each other. Alternatively, the channel-shaped carrier could be made of looped wire or could consist of a channel-shaped metal blank provided with slits to increase its longitudinal flexibility. A further possibility would be to construct it from a continuous metal blank which is bent into channel form and has a series of side-by-side corrugations, each running around the channel from one edge thereof to the other.

What is claimed is:

1. A channel-shaped strip structure, comprising channel-shaped metal carrier means,
   a covering of flexible material over and on the metal carrier means,
   a gripping rib running along and protruding from one inside wall of the channel and defined by the flexible covering material, and
   metal reinforcement which at least partly extends into the gripping rib and is separate from the carrier means and spaced therefrom by the flexible material.

2. A structure according to claim 1, in which the metal reinforcement is in the form of a longitudinally extending strip which is bent obtusely about a line running along the length thereof.

3. A structure according to claim 1, in which the metal reinforcement is made of hardened metal having spring-like qualities.

4. A channel-shaped strip structure, comprising channel-shaped metal carrier means,
   a covering of flexible material over and on the metal carrier means,
   a gripping rib running along and protruding from one inside wall of the channel and defined by the flexible covering material, and
   metal reinforcement which at least partly extends into the gripping rib,
   a portion of the carrier means running along one longitudinal edge thereof being bent over, inwardly of the channel, so as to grip the metal reinforcement and thereby join the metal reinforcement to the metal carrier means.

5. A structure according to claim 4, in which the metal reinforcement is in the form of a longitudinally extending strip which is bent obtusely about a line running along the length thereof.

6. A structure according to claim 4, in which the metal reinforcement is made of hardened metal having spring-like qualities.

7. A structure according to claim 4, in which the metal reinforcement defines spaced slits each running partway across its width so as to give it longitudinal flexibility.

8. A structure according to claim 4, in which the metal carrier means comprises a series of U-shaped elements.

9. A channel-shaped strip structure, comprising channel-shaped metal carrier means comprising a series of U-shaped elements in which each element is provided with a corrugation which runs around the U-shape of the element from the end of one leg thereof to the end of the other leg, with the depth of each corrugation being greatest at the base of the U and becoming shallower towards the end of each leg thereof,
   a covering of flexible material over and on the metal carrier means,
   a gripping rib running along and protruding from one inside wall of the channel and defined by the flexible covering material, and
   metal reinforcement which at least partly extends into the gripping rib.

10. A channel-shaped strip structure comprising metal carrier means, flexible covering material in which the carrier means is embedded, the metal carrier means comprising a series of U-shaped metal elements which are spaced from each other, and each element being provided with a corrugation which runs around the U from the end of one leg of the U to the end of the other leg thereof, and in which each said corrugation is greatest in depth at the base of the U and becomes shallower towards each leg end.

* * * * *